June 7, 1966  E. J. SCHAEFER  3,255,367
MULTIPLE SECTION MOTOR
Filed June 26, 1961  2 Sheets-Sheet 1
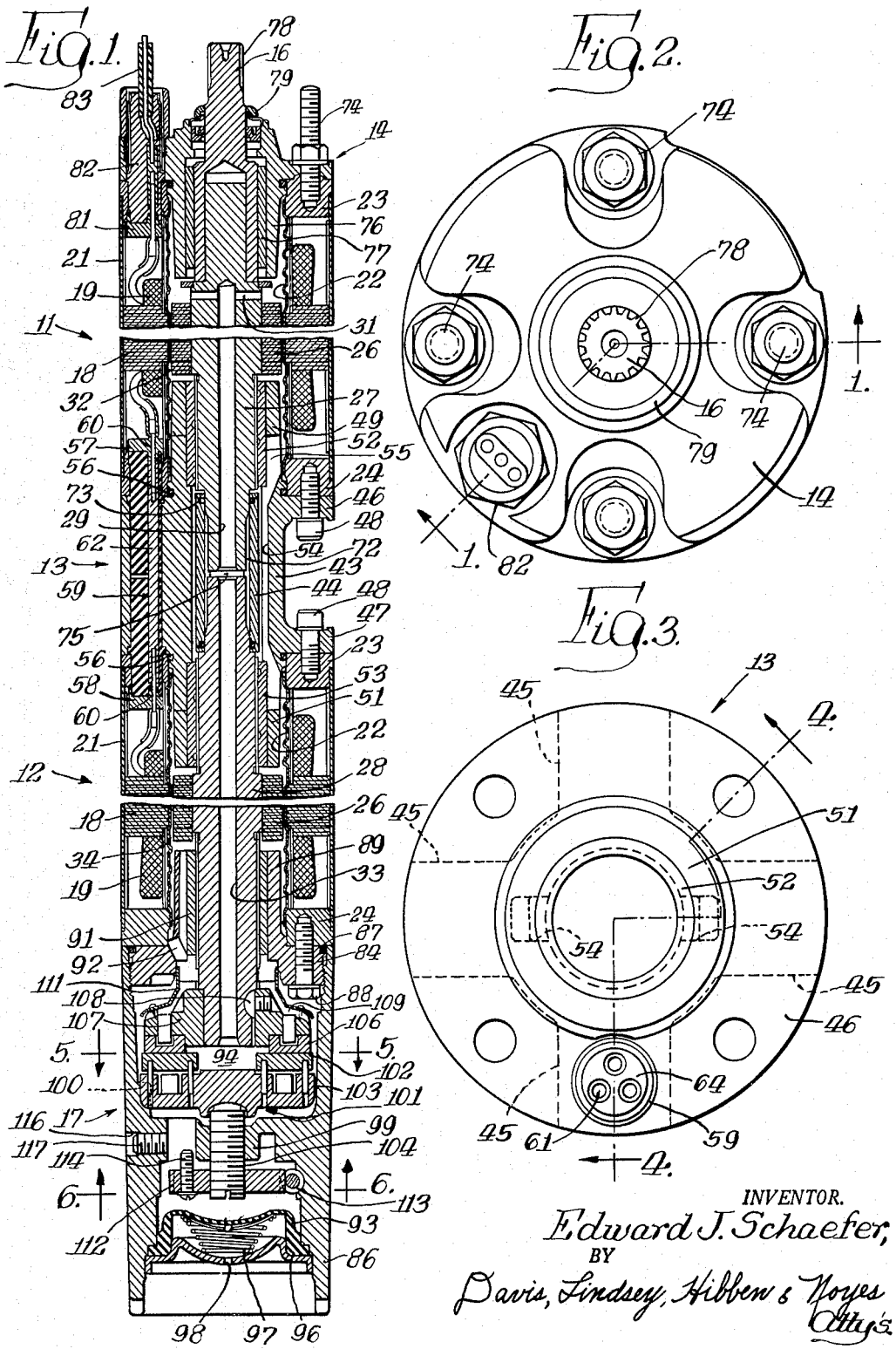
INVENTOR.
Edward J. Schaefer,
BY
Davis, Lindsey, Hibben & Noyes
Attys.

June 7, 1966  E. J. SCHAEFER  3,255,367
MULTIPLE SECTION MOTOR
Filed June 26, 1961  2 Sheets-Sheet 2
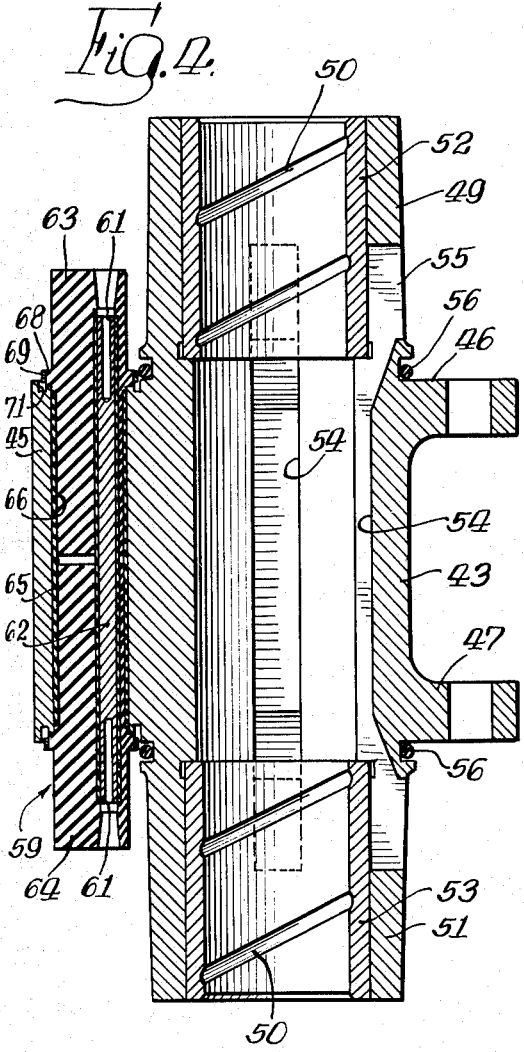
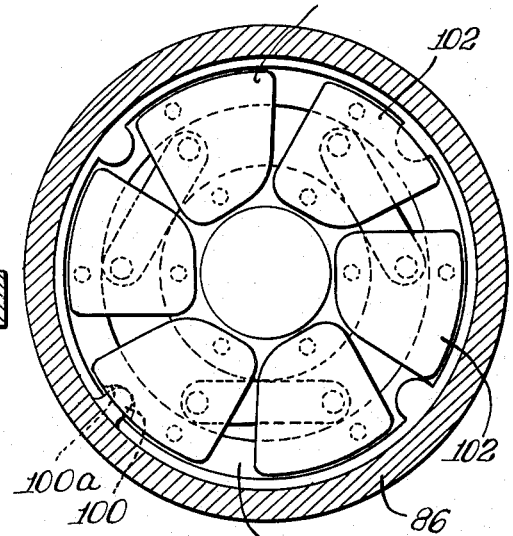
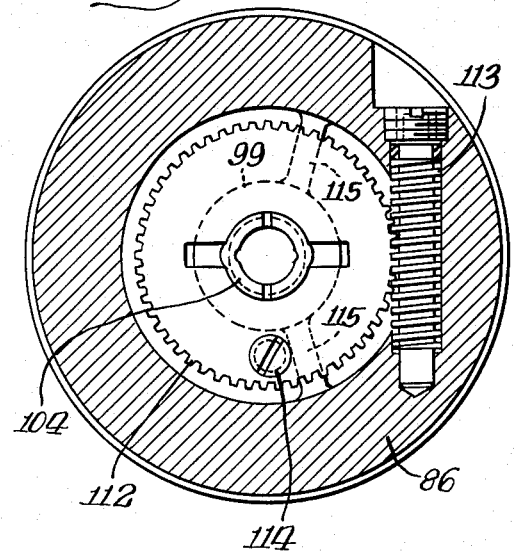
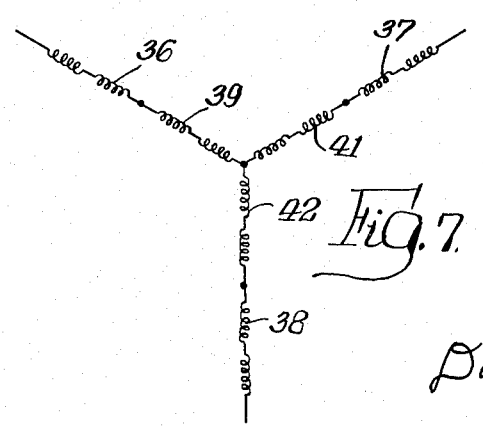
INVENTOR.
Edward J. Schaefer,
BY
Davis, Lindsey, Hibben & Noyes
Attys.

United States Patent Office

3,255,367
Patented June 7, 1966

3,255,367
MULTIPLE SECTION MOTOR
Edward J. Schaefer, Bluffton, Ind., assignor to Franklin Electric Co., Inc., Bluffton, Ind., a corporation of Indiana
Filed June 26, 1961, Ser. No. 119,494
14 Claims. (Cl. 310—87)

This invention relates to electric motors and more particularly to an assembly of motor units.

In recent years, it has become common practice to use submersible motors in wells, where such motors are used for pumping and for performing other operations in the wells. As the practice has increased, the demand for larger power motors has likewise increased.

Of course, to increase the power of motors requires an increase in the size of motors. However, motors for use in drilled wells and the like must be limited to a relatively small diameter, since they have to be inserted in the well casing. Thus, to provide more power, well motors have been lengthened as far as practical, but shaft vibration and other factors have imposed a limit on the length of rotor for motors that can be used in casings of usual diameters.

It is a primary object of the present invention to provide an electric motor structure of increased power for use in wells and the like.

A further object is to provide a novel electric motor assembly having a plurality of motor units that operate in unison.

Another object is to provide a submersible electric motor assembly having a plurality of motor units and a single coolant and lubricant system for the assembly.

Still another object is to provide a submersible electric motor assembly having a plurality of motor units and having a single thrust bearing device arranged to bear the thrust developed by all of the units.

A further object is to provide a submersible electric motor assembly that has a plurality of electric motor units and needs only a single set of power leads.

A still further object is to provide a novel connector device for conveniently interconnecting two motor units, which rigidly connects the casings of the units together and also interconnects the rotor shafts of the units, the field windings of the units and fluid passages in the units.

Other objects and advantages of the invention will be apparent from the following description taken in conjunction with the accompanying drawings wherein:

FIG. 1 is a longitudinal sectional view, on a reduced scale, of a submersible motor assembly embodying the present invention, FIG. 1 being taken substantially along line 1—1 in FIG. 2;

FIG. 2 is a top end view of the assembly shown in FIG. 1;

FIG. 3 is an end view of a connector member used in the assembly shown in FIG. 1;

FIG. 4 is a sectional view taken along line 4—4 in FIG. 3;

FIG. 5 is a sectional view taken along line 5—5 in FIG. 1;

FIG. 6 is a sectional view taken along line 6—6 in FIG. 1; and

FIG. 7 is a diagrammatic view showing one way of arranging the field windings in the assembly shown in FIG. 1.

The objects of the present invention are accomplished, in general, by an assembly comprising a plurality of motor units connected in tandem arrangement, that is, in end-to-end axial alignment. Thus, where more power is required than can be conveniently supplied by a single motor of maximum diameter, the present invention permits a second motor unit, and even a third motor unit to be added in tandem to the first unit. The motor units are held fixed in this relation by connecting means that also interconnects the rotor shafts of the units and may, as in the example illustrated in the drawing, also interconnect the field windings of the units and fluid passages in the units.

At its ends, the assembly has end termination units that cover the open ends of the assembly and contain elements for improving operation of the assembly. One end termination unit, for example, contains means for circulating a coolant throughout the assembly, a thrust bearing device for supporting the entire thrust load of the assembly during its operation, and a pressure balancing device. The other end unit provides means for connecting the assembly to power leads. Because the units are connected in series only a single set of such leads are needed, even though two, or even three or more motor units are assembled together as discussed hereafter. Also, one of the termination units has means for admitting fluid to the assembly's coolant system. A drive shaft projects from one end termination unit for supplying the power developed by the assembly to a driven device, such as a pump, such end termination unit being adapted to be connected to such driven device.

FIG. 1 shows a preferred form of motor assembly embodying the features of the present invention. Thus, the assembly comprises a pair of motor units, indicated generally at 11 and 12, arranged in axial alignment and rigidly connected together by connecting means indicated generally at 13. The upper end of the assembly is covered by an end termination unit 14 from which projects a shaft portion 16, adapted for connection to driven device, such as a pump. As will be seen hereafter, the shaft 16 transmits the power of both motor units 11 and 12 to such driven device. The lower end of the assembly is closed by a lower termination unit 17.

The motor units 11 and 12 are substantially alike, being elongated and cylindrical and comprising the usual stator and rotor elements. Thus, each of the motor units 11 and 12 comprises a stator including the usual stack of laminations 18 and field windings 19 arranged in a conventional manner. Each unit has its stator enclosed by a casing comprising a cylindrical sleeve 21 on the outside of the stator and a thin cylindrical liner 22 on the inside of the stator, thus defining an annular space therebetween. At their opposite ends, the sleeve 21 and liner 22 are secured, as by welding, to annular end rings 23 and 24, and seal the stator in the annular space.

The present units 11 and 12 are three phase units, and thus each of their stators has three field windings. As diagrammatically shown in FIG. 7, the unit 11 has field windings 36, 37, and 38, and the unit 12 has field windings 39, 41 and 42. The windings 39, 41 and 42 are interconnected, in the usual manner, as shown in FIG. 7, to form a Y connection at the lower end of the motor unit 12. The windings 36, 37 and 38 are not so interconnected.

Each of the motor units 11 and 12 also has a rotor 26 and the rotors 26 are respectively mounted on rotor shafts 27 and 28. The rotors 26 are of the squirrel cage type and their shafts project axially from the units, as shown.

The present assembly is equipped with a coolant system and to this end, the motor units 11 and 12 have passages for carrying coolant fluid through the unit. Thus, the shaft 27 has an axial bore 29 that connects to a radial bore 31 at the upper end of the shaft 27 for carrying coolant in one direction through the motor unit 11. Coolant passes in the opposite direction through the motor unit 11 through an axial space, indicated at 32, between the liner 22 and the rotor 26. Similarly, in the unit 12 the rotor shaft 28 is provided with an axial bore 33 for carrying coolant fluid through the unit 12 in one direction and space 34, between its rotor 18 and the liner 22 of the unit 12, carries such coolant in the opposite direction through the unit 12.

The connecting means 13, for connecting the motor units 11 and 12 in end-to-end axial alignment, is an important feature of the present invention. Such connecting means not only rigidly interconnects the motor units but also makes the electrical connections necessary to connect the windings of the units in series, connects the fluid passages in the two motor units together and connects the rotor shafts 27 and 28 together for rotation in unison. Thus, the connecting means 13 comprises a tubular member 43 which is, in effect, a dual end bell member shown in detail in FIGS. 3 and 4. The tubular member 43 rigidly interconnects the adjacent ends of the stator casings of motor units 11 and 12. For this purpose, the member 43 is provided with a pair of axially spaced flanges 46 and 47 which abut against the end ring 24 of motor unit 11 and end ring 23 of motor unit 12. The flanges are secured to the end rings as by screws 48. Four longitudinal ribs 45 join the flanges 46 and 47 for strengthening the member 43.

The member 43 provides bearings for the adjacent ends of the shafts 27 and 28. In this instance, member 43 has bearing support portions 49 and 51 that project axially into the motor units 11 and 12, respectively, and are provided with radial bearings 52 and 53. The radial bearing 52 supports the lower end of shaft 27, as shown in FIG. 11, while the bearing 53 supports the upper end of the shaft 28. The bearings 52 and 53 are exposed to the fluid in the assembly and have helical grooves 50 (see FIG. 4) for passing the fluid through the bearings 52 and 53. Hence, these bearings are adapted to be lubricated by the fluid.

The member 43 also interconnects fluid passages in the motor units. To this end, the member 43 is provided with a pair of longitudinally extending slots 54 that extend to openings 55 through the portions 49 and 51 and thus provide flow communication from the space 32 in the upper unit to the space 34 in the lower unit. Coolant fluid may thus pass from the space 32 in unit 11 over the outside of the portion 49, through the openings 55, downwardly through the slots 54, out through the openings 55 in the portion 51 and over the portion 51 into the space 34 at the upper end of the motor unit 12. To prevent leakage of liquid at the ends of the member 43, the latter is provided with sealing means comprising a pair of O-rings 56 mounted in circumferential grooves located adjacent the flanges 46 and 47. The O-rings 56 engage the end ring 24 of the upper unit and the end ring 23 of the lower unit, respectively.

The connecting means 13 also includes means for interconnecting the adjacent ends of the shafts 27 and 28 for segregating the fluid passage through the center of the shafts from the fluid passage provided, in part, by the slots 54. To this end, the adjacent ends of the shafts 27 and 28 are splined, as shown at 72, in FIG. 1, and a sleeve 44 having internal splines for cooperation with the splines on the shafts 27 and 28 is telescoped over the ends of the shafts. To transfer thrust from the shaft 29 of the upper unit to the shaft 28 of the lower unit, a washer 75 is interposed between the ends of the shafts within the sleeve 44. At its opposite ends, the sleeve 44 is provided with internal circumferential grooves containing O-rings 73, which seat on the shafts beyond the splines. Thus, the sleeve 44 provides a driving connection between the shafts 27 and 28. The sleeve 44 also bridges the space between the ends of the shafts and segregates the passage formed by the bores 29 and 33 in the shafts from the fluid passage outside the shafts, which includes the slots 54. In this connection, it should be noted that the sleeve 44 and the member 43 are in circumferentially spaced relation, the space between the sleeve 44 and the member 43, being included with the slots 54 as the fluid passage outside the shafts.

In the present assembly, the field windings 36, 37 and 38 of the upper motor unit 11 are connected in series with the field windings 39, 41 and 42, respectively, and only a single set of power leads is required for the assembly. To make these connections, the member 43 is provided with an electrical connector device 59 that cooperates with mating connector elements in the units 11 and 12 to form the connections when the member 43 is secured to the ends of the motor units 11 and 12. As shown in FIG. 1, the end ring 24 of the motor unit 11 is provided with a hole and mounted therein is a connector element 57 having three prongs respectively connected to the three field windings of the unit, one prong being shown at 60. Likewise, the lower motor unit 12 has a similar electrical connector element 58 mounted in a hole in its end ring 23.

The connector device 59 is an elongated structure and extends through the member 43. Each end of the device 59 has three tubular sockets 61 for receiving the prongs 60 of the connector elements 57 or 58. As indicated in FIG. 4, the sockets 61 are formed in the two ends of conductors 62. The conductors 62 are imbedded in a pair of bushings 63 and 64 of resilient insulating material, the inner ends of which are enclosed by a tube 65 of insulating material and located in a bore 66 formed in one of the ribs 45 joining the flanges 46 and 47 at the side of the member 43.

When the connector device 59 is engaged with the connector elements 57 and 58 and the member 43 is secured to the end rings 24 and 23, the bushings 63 and 64 are compressed and seal against the end rings within the holes therein and against the elements 57 and 58. Sealing is also provided by a circumferential flange 68, formed on each of the bushings 63 and 64. The flanges 68 are confined by metal rings on ferrules 69 which seat in circular grooves or recesses 71 when the parts are assembled. The metal ring 69 prevents the flange 68 from being spread out and pinched by the adjacent metal parts when the screws 48 are pulled tight. The ring 69 also assists in preventing misalignment of the facing metal parts due to bulging of the resilient flange 68. Thus, it can be seen that the windings of the motor units are automatically connected together in series and sealed by the connector device 59 when the tubular member 43 has been secured to its associated motor units.

At the upper end of the assembly, the upper end of the motor unit 11 is closed by the upper end termination unit 14. The upper end termination unit 14 is secured to the end ring 23 of the upper motor unit 11 as by a plurality of circumferentially arranged screws 74. In the present instance, the screws 74 also extend upwardly from the upper end termination unit 14 for connection to a unit to be driven by the motor assembly, such as a pump. The unit 14 includes an inwardly extending tubular portion 76 concentric with the shaft 27 and carrying a bearing 77 that supports the shaft portion 16, mentioned above, which is a shaft extension telescopically forced on the upper end of the shaft 27. The upper end of the shaft portion 16 is splined, as shown at 78 in FIGS. 1 and 2, for cooperation with a mating spline shaft in the pump. A seal 79 is mounted in the unit 14 for cooperation with the shaft portion 16.

The upper end termination unit 14 also has means for connecting the assembly to a power line. In this instance, the end ring 23 of the upper motor unit has a hole in which a connector element 81 is mounted. A mating connector element 82 has three terminals connected to three motor leads 83. When the upper termination unit 14 is mounted on the upper motor unit 11 and secured thereto, the connector elements 81 and 82 are engaged and both motor units are thus connected for operation. The connector elements 81 and 82 cooperate with each other in substantially the same manner as the connector element 57 and the connector device 59.

Other important features of the present invention are embodied in the lower termination unit 17. This unit comprises a ring portion 84 threaded into a housing portion 86 and sealed by an O-ring 87 (see FIG. 1) which is confined by the rings portion 84, the housing portion 86 and the end ring 24 of the lower motor unit. The ring portion is secured to the end ring 24, as by screws 88, and has a bearing support portion 89 on its upper end, projecting into the end of the lower motor unit. The portion 89 supports a radial bearing 91, which, in turn, carries the lower end of the shaft 28 of the lower unit 12. Passages 92 through the portion 89 connect the fluid passage provided by the space 34 with the interior of the lower termination unit 17. Fluid also flows through the bearing 91 and lubricates the same.

The housing portion 86 of the lower termination unit 17 is in the form of an elongated tubular structure closed at its lower end by a resilient diaphragm 93, which constitutes a receptacle for enclosing elements of the assembly and for collecting coolant fluid after it has been circulated through the assembly. In the housing portion 86 are located means for circulating the coolant fluid through the assembly, and thrust bearing means adapted to support the thrust forces in the assembly. The portion 86 also contains means coacting with the thrust bearing means to adjust the axial position of the shafts in the assembly.

The diaphragm 93 is located in the lower end of the portion 86 and is held in position by a sheet metal disk 96 forced into the lower end of the portion 86. The disk 96 is separated from the diaphragm 93 by a coil spring 97. Coolant fluid will fill the space, indicated at 94, above the diaphragm 93 and will contact the inner force of the diaphragm 93. Liquid on the outside of the assembly will contact the outer face of the diaphragm 93 by passing through an opening 98 in the center of the disk 96. Thus, the diaphragm 93 functions as a pressure equalizer for the coolant system in the assembly.

Intermediate its ends, the housing portion 86 of the lower termination unit 17 is provided with transversely extending support structure 99 on which is carried a thrust bearing 101 for the assembly (see FIGS. 1 and 5). The thrust bearing 101 is substantially like the thrust bearing illustrated in FIG. 5 of my Patent No. 2,779,637 and comprises a plurality of bearing segments 102 rockably mounted on a stationary disk 103. The disk 103 is centrally supported by an axially extending screw 104 threaded in the support 99 and held against rotation by a lug 100 on the portion 86 and projecting into a notch 100a, in the disk 103. The segments 102 bear against a bearing ring 106 on a disk 107 secured to the lower end of the shaft 28 by a key 108. Thus, it can be seen that the entire thrust load on the shafts 27 and 28 will be carried by the thrust bearing 101.

For circulating the coolant fluid through the system, the upper surface of the disk 107, which rotates with the shaft 28, is provided with impeller vanes 109 and a sheet metal shroud 111, forming a pump. The inlet to the shroud 111 is located adjacent the passages 92 and its outlet is in the space 94 at the thrust bearing segment. Thus, coolant will be circulated into the space 94, up through the bores 33 and 29 in the shafts, out through the radial bores 31, down through the space 32 between the rotor 26 of the upper motor unit and its liner 22, into the top openings 55 as well as into the top of the groove 50 in the bearing 52, down through the groove 50, the passage formed by the slots 54 in the member 43 and the space between the member 43 and sleeve 44, through the lower openings 55 and through the groove 50 in bearing 53, down through the space 34 between the rotor 26 and the liner 22 of the lower motor unit 12, and through the passages 92 and bearing 91 to the vanes on the disk 107.

The fluid circulating through the system will, of course, pick up much heat as it circulates through the two motor units. To dissipate this heat, the lower termination unit has a relatively large surface area inside the unit in contact with the fluid being circulated, the area extending from the bottom of the ring portion 84 down to the diaphragm 93. The unit also has a relatively large outer surface in contact with ambient fluid. Hence, the lower termination unit acts as a heat exchanger for the assembly's coolant system.

To fill the cooling system with fluid, the portion 86 is provided with an opening 116 having a removable threaded plug 117.

As was mentioned heretofore, the lower termination unit contains means for adjusting the position of the shafts in the assembly. To adjust the axial position in the assembly of the shafts 27 and 28, the screw 104 is rigidly secured to a toothed worm wheel 112 cooperating with a worm 113. Rotation of the worm 113 rotates the wheel 112 and the screw 104 and thus raises or lowers the thrust disk 103. This, in turn, shifts the shafts 27 and 28 axially. The worm 113 is rotatably mounted in the wall of the housing portion 86 and one end of the worm 113 is accessible from the exterior of the housing portion, as shown in FIG. 6, so that it may be readily adjusted. A screw 114 is mounted in the worm wheel 112 and is adapted to engage ribs 115 extending from the support structure 99 to prevent undue rotation of the screw 104.

The end-to-end arrangement of the units permits a manufacturer to increase the power of an assembly by merely adding a motor unit and connector unit to the assembly intermediate the end termination units. It will, of course, be recognized by those skilled in the art that such an addition requires a corresponding voltage increase in the power leads to the assembly. Hence, an assembly of relatively large power, for use in wells and the like, can easily be provided by a manufacturer. Moreover, the structure is such that assemblies of different power can be provided, using only one size of motor units and one size connectors.

I claim:

1. A submersible electric motor assembly comprising at least two motor units arranged in axially aligned end-to-end relation, each of said motor units having a rotor mounted on a rotor shaft projecting axially of the motor unit and a stator around said rotor and including a field winding, each motor unit further including at its end which is adjacent the other motor unit a plurality of electrical connector elements which are electrically connected to the field windings of the associated motor unit and have fixed locations relative to the stator, and an intermediate unit positioned between said adjacent ends of said motor units and releasably secured to said stators of said motors units for holding said motor units in said end-to-end assembled relation and for connecting said rotor shafts together for operation in unison, said intermediate unit further including interconnected electrical connector elements at both axial ends thereof, said connector elements of said intermediate unit having fixed locations on said intermediate unit and being located to automatically engage said electrical connector elements of said motor units upon movement of said intermediate unit into secured relation with said motor units, said electrical connector elements of said intermediate unit connecting the field windings of said motor units together when said intermediate unit is secured to said motor unis, and sealing means on said motor units and said intermediate unit forming liquid tight seals around said connector elements when said motor units are in secured relation with said intermediate unit.

2. An assembly as in claim 1, wherein each of said motor units further includes a sealed axially extending casing containing said stator and said rotor, and said intermediate unit cooperates with said casings of said motor units to form an elongated chamber adapted to receive a cooling fluid.

3. An assembly as in claim 2, wherein said motor units have fluid passageways formed therein for a cooling fluid, and said intermediate unit also has fluid passageways formed therethrough connecting said fluid passageways of said motor units together to provide an integrated cooling system for the assembly.

4. An assembly as in claim 3, wherein a portion of said fluid passageways comprises axial bores in said rotor shafts for carrying a coolant in one direction through said assembly, said bores being interconnected by said intermediate unit.

5. An assembly as in claim 1, wherein said intermediate unit includes a sleeve coupling for interconnecting said rotor shafts of said motor units for said operation in unison, each of said rotor shafts having an axial bore formed therethrough to provide a fluid passageway for a cooling fluid, said sleeve coupling further interconnecting said axial bores, said intermediate unit further including a casing forming an outer wall, and said sleeve being located in concentric spaced relation from said outer wall to provide a passageway for fluid flow therebetween.

6. An assembly as in claim 5, and further including means for circulating a fluid through said passageways.

7. An assembly as in claim 2, and further including an upper end termination unit mounted on the upper end of the uppermost of said motor units for substantially sealing the upper end of the assembly, said uppermost of said motor units having its rotor shaft projecting through said upper end termination unit for engagement with apparatus to be driven, and a lower end termination unit mounted on the lower end of the lowermost of said motor units for substantially sealing the lower end of said assembly, said end termination units including a thrust bearing, fluid pressure equalization means, and a coolant heat exchanger.

8. A submersible electric motor assembly comprising at least two motor units arranged in axially aligned end-to-end relation, each of said motor units having a rotor mounted on a rotor shaft projecting axially of the motor unit and a stator around said rotor and including a field winding, each motor unit further including at its end which is adjacent the other motor unit a plurality of electrical connector elements which are electrically connected to the field winding of the associated motor unit and have fixed locations relative to the stator, and an intermediate unit positioned between said adjacent ends of said motor units and releasibly secured to said stators of said motor units for holding said motor units in said end-to-end relation and for connecting said rotor shafts together for operation in unison, said intermediate unit further including interconnected electrical connector elements at both axial ends thereof, said connector elements of said intermediate unit having fixed locations on said intermediate unit and being located to automatically engage said electrical connector elements of said motor units upon movement of said intermediate unit into secured relation with said motor units, said electrical connector elements of said intermediate unit connecting the field windings of said motor units together when said intermediate unit is secured to said motor units, sealing means on said motor units and said intermediate unit forming liquid tight seals around said connector elements when said motor units are in secured relation with said intermediate unit, an upper end termination unit releasably secured to the upper end of the uppermost of said motor units for substantially sealing the upper end of the assembly, said uppermost of said motor units having its rotor shaft projecting through said upper end termination unit for engagement with apparatus to be driven, said upper end termination unit having electrical connector elements mounted in fixed locations thereon and being similar to said electrical connector elements of said intermediate unit, and said uppermost motor unit having electrical connector elements mounted in fixed locations thereon and located to automatically engage said connector elements of said upper end termination units upon movement of said upper end termination unit into secured relation with said uppermost motor unit, said electrical connector elements at the upper end of said uppermost motor unit being connected to the field windings of said uppermost motor unit, and said electrical connector elements of said upper end termination unit being adapted to be connected to a source of electric power.

9. A submersible electric motor assembly comprising at least two motor units arranged in axially aligned end-to-end relation, each of said motor units having a rotor mounted on a rotor shaft projecting axially of the unit and a stator around said rotor and including a field winding, each motor unit further including at its end which is adjacent the other motor unit a plurality of electrical connector elements which are electrically connected to the field windings of the associated motor unit and have fixed locations relative to the stator, and an intermediate unit positioned between said adjacent ends of said motor units and releasably secured to said stators of said motor units for holding said motor units in said end-to-end relation and for connecting said rotor shafts together for operation in unison, said intermediate unit further including electrical connector elements mounted in fixed locations thereon and extending longitudinally of said intermediate unit, the opposite ends of said electrical connector elements of said intermediate unit being located to automatically engage said electrical connector elements of said motor units upon movement of said intermediate unit into secured relation with said motor units, and sealing means on said motor units and said intermediate unit forming liquid tight seals around said electrical connector elements when said motor units are in secured relation with said intermediate unit.

10. An assembly as in claim 9, wherein said electrical connector elements of said motor units and said intermediate unit are in the form of plugs and sockets.

11. An intermediate unit for connecting a pair of electric motor units, comprising a generally tubular member adapted to be releasably secured at its ends to the respective motor units, means located within said tubular member and adapted to connect the rotor shafts of the motor units for operation in unison, and interconnected electrical connector elements at the ends of said tubular member, said electrical connector elements of said intermediate unit being of the prong and socket type and having fixed locations on said tubular member and adapted to mate with electrical connector elements of the motor units and being automatically movable into operative electrical engagement therewith upon movement of said intermediate unit into secured relation with said motor units, and sealing means forming a liquid tight seal around said electrical connector elements when said intermediate unit is in secured relation with the motor units.

12. Apparatus as in claim 11, wherein said electrical connector elements of said intermediate unit comprise at least one electric conductor which extends longitudinally of said tubular member and has coupling portions at its opposite ends for sliding engagement with mating electrical connectors of said motor units.

13. Apparatus as in claim 12, wherein said tubular member has at least one longitudinally extending bore formed therethrough, and each electric conductor is mounted in one of said bores.

14. Apparatus as in claim 12, wherein said electrical connector elements of said intermediate unit comprise an assembly of electrodes embedded in an elongated resilient body, said body being made of electrical insulating material and insulating said electrodes from said tubular member, said body further forming a liquid tight seal around said electrodes when said intermediate unit is secured to the motor units.

(References on following page)

References Cited by the Examiner

UNITED STATES PATENTS

| | | | |
|---|---|---|---|
| 1,960,484 | 5/1934 | Ekstromer | 310—112 |
| 2,098,958 | 11/1937 | Ekstromer | 310—112 |
| 2,219,318 | 10/1940 | Hoover | 310—87 |
| 2,240,569 | 5/1941 | Myers | 310—87 |
| 2,531,120 | 11/1950 | Feaster | 310—112 |
| 2,568,548 | 9/1951 | Howard | 310—87 |
| 2,578,837 | 12/1951 | Raney | 310—112 |
| 2,703,371 | 3/1955 | Wrightman | 310—87 |
| 2,904,709 | 9/1959 | Lautner | 310—90 |
| 2,944,297 | 6/1960 | Maynard | 310—87 |
| 3,128,399 | 4/1964 | O'Reilly | 310—87 |

FOREIGN PATENTS 1,093,469   11/1960.   Germany.

MILTON O. HIRSHFIELD, *Primary Examiner.*

ORIS L. RADER, *Examiner.*

J. W. GIBBS, *Assistant Examiner.*